Oct. 16, 1956  T. G. BRASHEAR, JR  2,767,302
WELDING APPARATUS
Filed Dec. 9, 1953  5 Sheets-Sheet 1
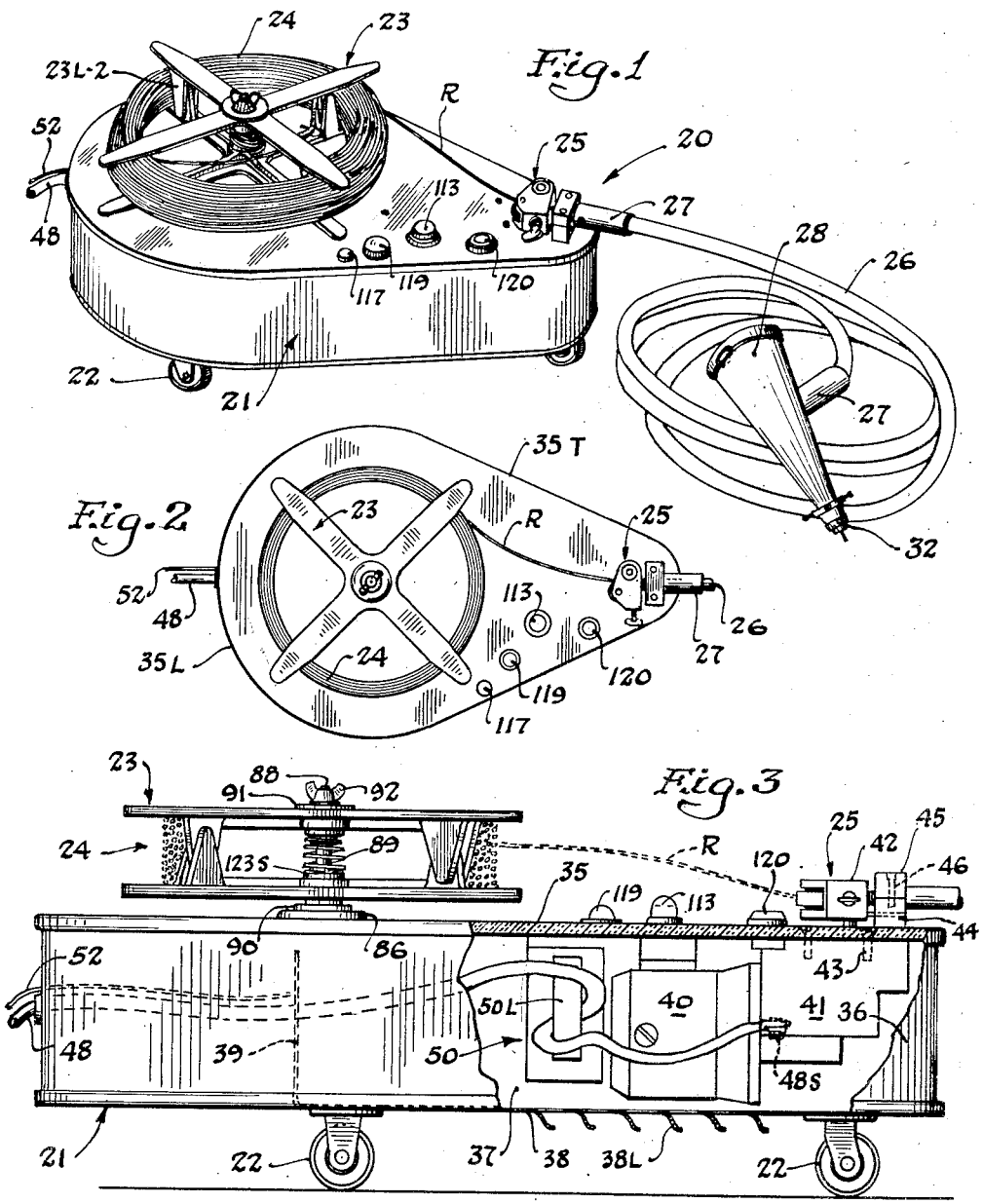
Inventor
Turner G. Brashear Jr.
By Wallace and Cannon
Attorneys

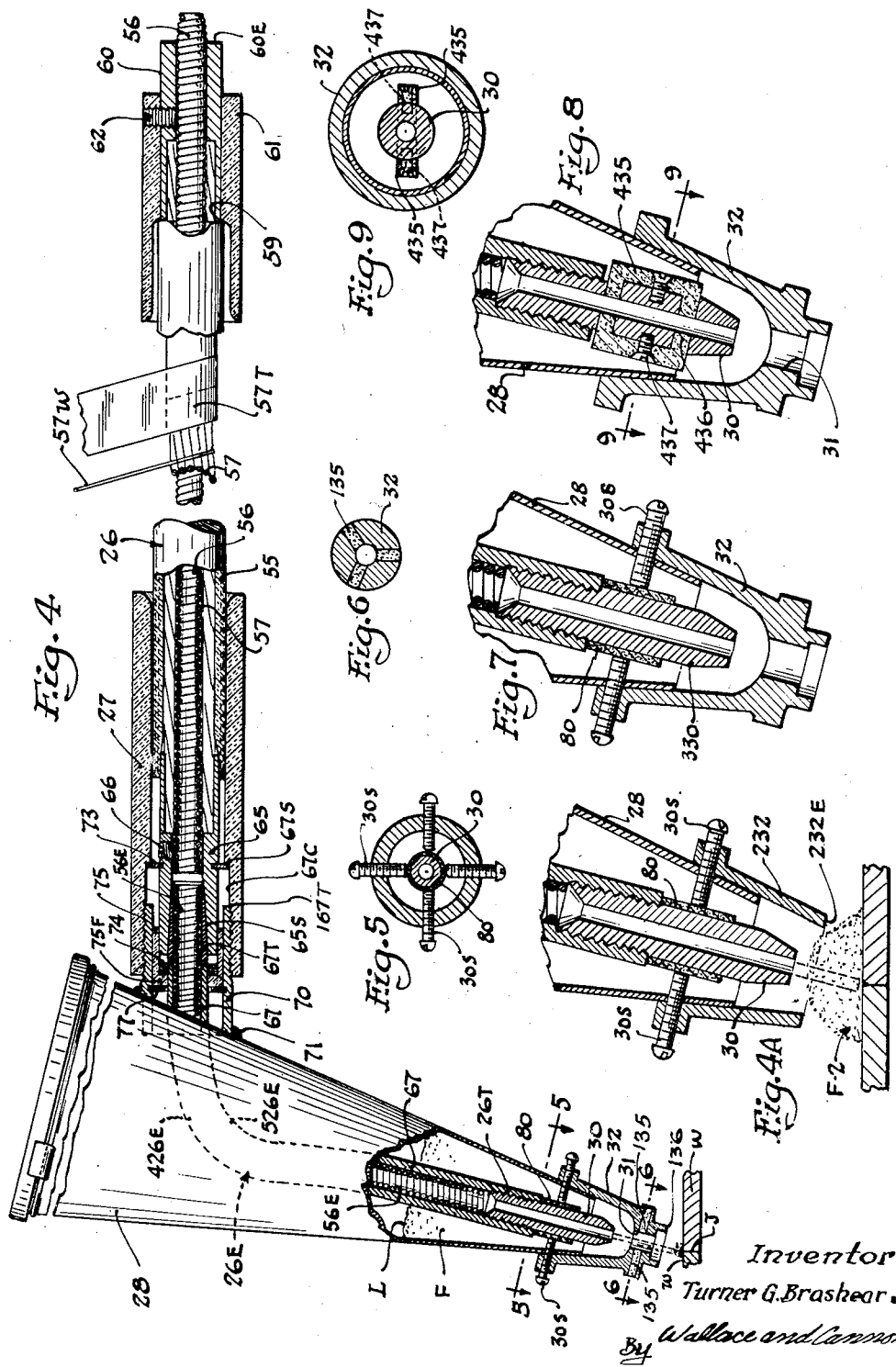

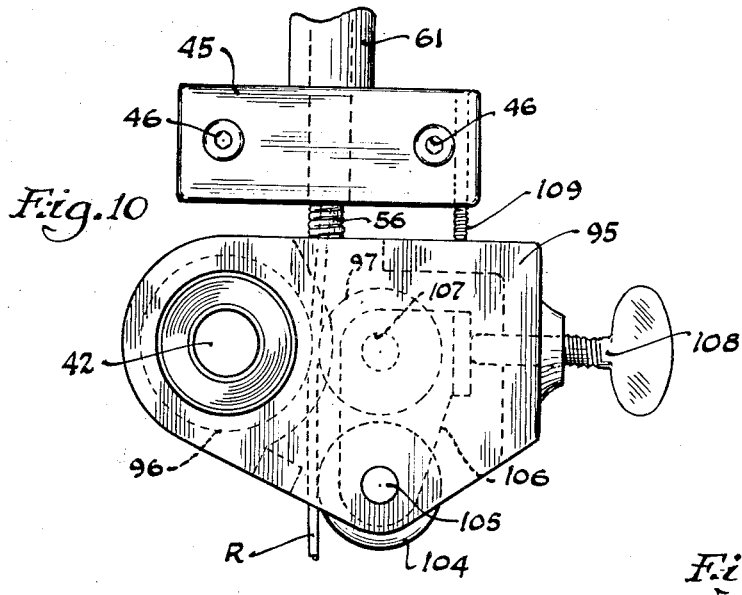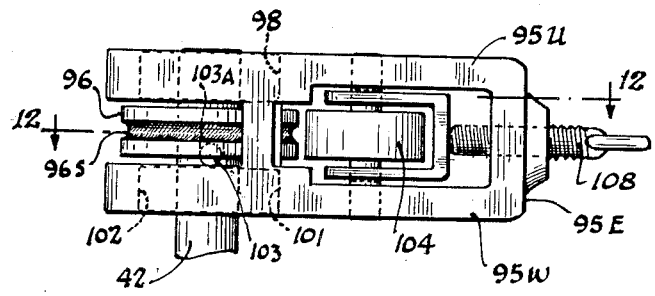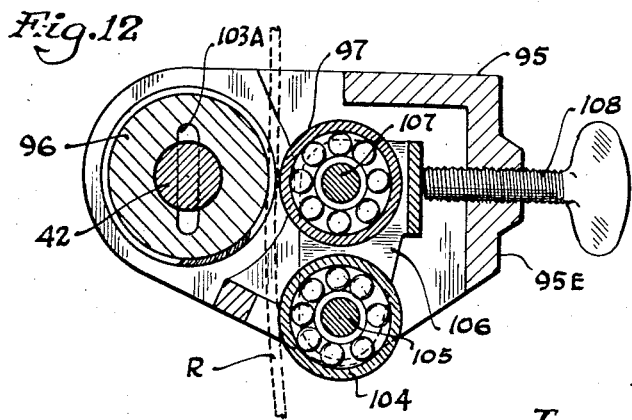

Oct. 16, 1956    T. G. BRASHEAR, JR    2,767,302
WELDING APPARATUS
Filed Dec. 9, 1953    5 Sheets-Sheet 4

Inventor
Turner G. Brashear Jr.
By Wallace and Cannon
Attorneys

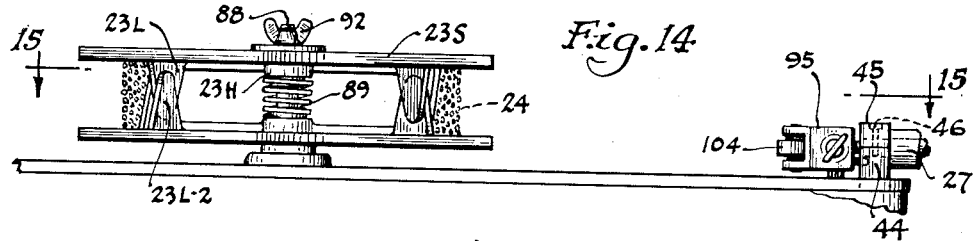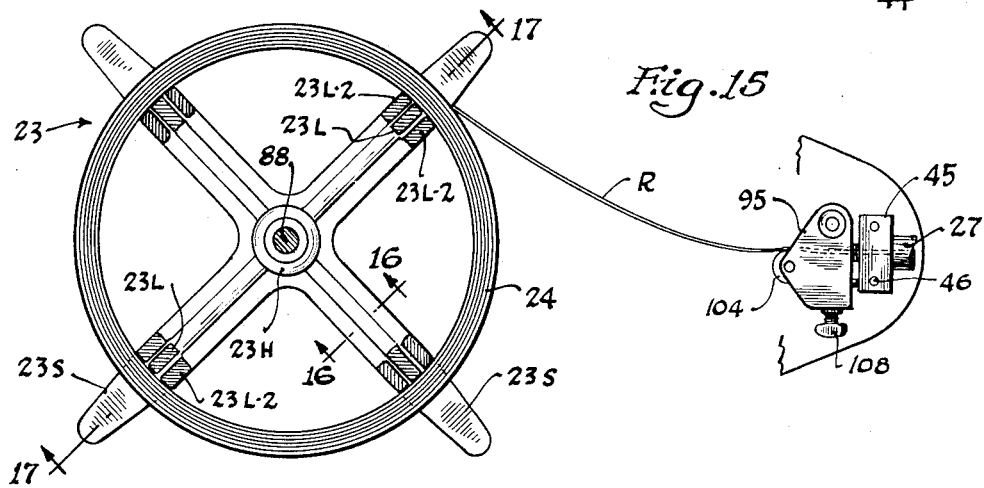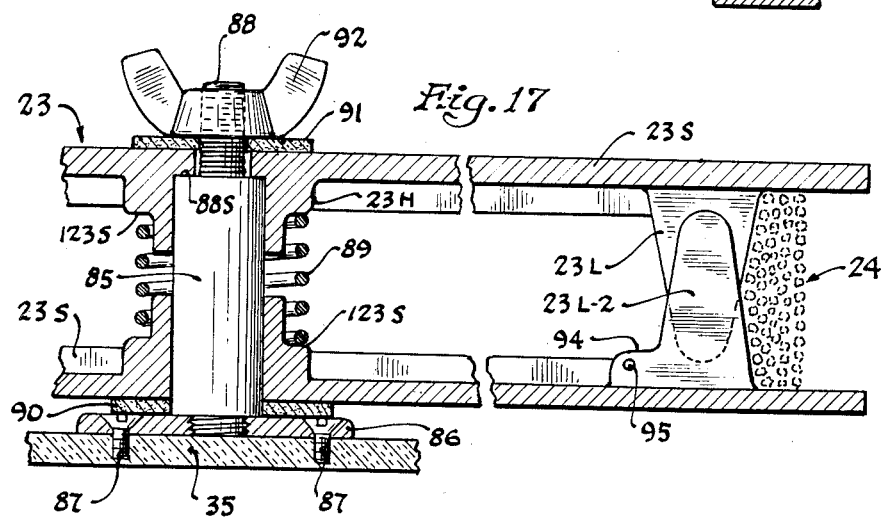

United States Patent Office 2,767,302
Patented Oct. 16, 1956

2,767,302

WELDING APPARATUS

Turner G. Brashear, Jr., El Cerrito, Calif., assignor to American Brake Shoe Company, Wilmington, Del., a corporation of Delaware Application December 9, 1953, Serial No. 397,181

6 Claims. (Cl. 219—130)

This invention relates to continuous welding apparatus and particularly to such apparatus that may be utilized for semi-automatic continuous welding operation.

In the past, where continuous welding operations were to be performed, it has been customary to utilize automatic welding apparatus involving the provision of fixed or permanently located welding fixtures, and in other instances where it has been desired to perform continuous welding operations, the welding fixture has been mounted on movable carriages so that it may be advanced along the seam that is to be welded. In many instances, the welding operation is performed through the use of relatively heavy flux-coated welding rods, while in other instances, resort has been had to submerged arc welding techniques so that uncoated welding rod might be used. The apparatus heretofore used has been objectionable in different respects in that the use of flux-coated welding rod has rendered the welding apparatus non-portable in character, while in those instances where resort has been had to submerged arc welding, it has been impossible to judge the character or proper location of the welded seam that is being formed.

In view of the foregoing, the primary object of the present invention is to afford a semi-automatic continuous welding apparatus that is relatively portable in character and which may be used either for visible arc or submerged arc welding techniques as circumstances may dictate. Further and related objects are to afford such a continuous welding apparatus wherein uncoated relatively small diameter welding wire may be conveniently utilized, and particularly to provide such an apparatus where the supply coil of uncoated welding wire is located on a movable carriage that is remote with respect to the welding tip. Further objects are to simplify the loading of the supply coil of uncoated welding wire and the threading of the welding wire through the guide housing to the welding tip, to attain automatically controlled feeding of the welding wire during the welding operation, to automatically coat the welding wire with the required amount of flux, and to retain this flux on the welding wire during interruptions in the welding operation. In the use of apparatus where welding wire is automatically fed to the tip, it often happens that the welding wire freezes or becomes immovably attached to the tip, and a further object of the present invention is to afford a wire guiding means whereby the removal of the welding wire in such instances is facilitated.

In the application of flux to the uncoated welding wire, a magnetizable welding flux is utilized and is supplied from a supply hopper, the lower or discharge end of which surrounds the welding tip, and the thickness of the coating of welding flux that is applied to the welding wire must be governed by a metering or discharge orifice located between the welding tip and the point at which the welding actually takes place. This discharge orifice of the hopper is therefore located in such close proximity to the molten metal during the welding operation that it is subjected to splatter of the weld material, and a further object of the present invention is to protect the discharge orifice of the hopper so that this orifice does not tend to become plugged or modified in shape in the course of a welding operation.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a perspective view of a semi-automatic continuous welding apparatus embodying the features of the invention;

Fig. 2 is a plan view of the carriage upon which the reel of welding rod and other elements of the apparatus are supported;

Fig. 3 is a side elevational view, taken partially in vertical section and showing further details of the carriage;

Fig. 4 is a longitudinal sectional view through the flux-hopper, the welding tip and the flexible guide housing through which the welding rod is fed;

Fig. 4A is a cross sectional view of the flux-hopper modified for use in submerged arc welding operations;

Fig. 5 is a transverse sectional view of the welding tip and hopper taken substantially along the line 5—5 of Fig. 4;

Fig. 6 is a transverse cross sectional view of the discharge end of the hopper, the view being taken substantially along the line 6—6 of Fig. 4;

Fig. 7 is a fragmentary vertical section of the lower portion of the hopper and welding tip and illustrating an alternative embodiment;

Fig. 8 is a view similar to Fig. 7 and illustrating a further alternative embodiment of the invention;

Fig. 9 is a transverse cross sectional view of the hopper and tip, the view being taken substantially along the line 9—9 of Fig. 8;

Fig. 10 is a plan view of the adjustable feed roll mechanism for advancing the welding rod;

Fig. 11 is a front elevational view of the rod feeding mechanism;

Fig. 12 is a plan sectional view of the adjustable feed roll mechanism, the view being taken substantially along the line 12—12 of Fig. 11;

Fig. 13 is a schematic wiring diagram showing the electrical association of the elements of the apparatus;

Fig. 14 is a side elevational view of the reel that holds the coil of welding rod;

Fig. 15 is a plan view of the structure shown in Fig. 14, the upper spider of the reel being removed;

Fig. 16 is a cross sectional view taken along the line 16—16 of Fig. 15; and

Fig. 17 is a fragmentary vertical sectional view taken substantially along the line 17—17 of Fig. 15.

For purposes of disclosure, the invention is herein illustrated as embodied in a continuous semi-automatic welding apparatus 20 that embodies a caster-mounted carriage 21 supported by three spaced casters 22 and having a supply reel 23 disposed on the upper surface of the carriage 21 to support and center a coil 24 of relatively thin uncoated welding wire R, and this welding wire R is led from the coil 24 and through a feed mechanism 25 into an elongated flexible hose-like housing 26 which is relatively long and which at its other end extends through a tubular insulating handle 27 that projects laterally from one side of a conical flux-hopper 28. The flexible hose-like housing 26 extends through the handle 27 and has a separably related extension 26E disposed within the hopper 28 and terminating in a welding tip 30 disposed in a centered relation axially of the hopper 28 and aligned with a discharge orifice 31 that is formed in a detachably related discharge head 32 that is secured on the lower end of the hopper 28. The hopper 28 is filled with welding flux in powdered or granular form, and while normally the hopper 28 is initially filled to its full capacity, the flux F is indicated herein as extending up to a level L. The welding tip 30 is thus completely surrounded by the flux F, and this flux may flow downwardly through the discharge orifice 31 in an annular stream about the welding wire R as the wire R moves through the orifice 31 and toward a welding point such as the joint J between the work pieces W that are to be welded together.

The carriage 21 is formed from a relatively heavy top plate 35 made of insulating material to facilitate the mounting and assembly of certain of the electrical components of the apparatus, and as herein shown, this top plate is formed in plan to afford a large end 35L and this merges with a tapered end 35T and the reel 23 is mounted in a centered relationship on and above the larger portion of the top plate 35, while the wire-feed mechanism 25 and the related parts of the apparatus are mounted at the smaller or tapered end 35T. The insulating top plate 35 is provided with an apron-like depending side wall 36 that is fixed to and extends entirely about the edges of the top plate 35, and beneath the top plate and within the space defined by the depending side wall 36, a mounting chamber 37 is defined by removable bottom wall 38 which has an upstanding partition wall 39 formed at the left-hand end thereof, as viewed in Fig. 3. The bottom wall 38 is provided with louvers 38L so as to provide for flow of cooling air through the mounting chamber 37.

Within the mounting chamber 37, an electric feed motor 40 is mounted, and in the present instance this motor is mounted in a metal frame or housing and is mounted in fixed relationship to a reduction gear housing 41, the gearing contained within the housing 41 being driven by the motor 40, and such gearing terminating in an output shaft 42 that extends vertically through the top plate 35 and which is drivingly connected to the rod feed mechanism 25 as will be described in detail hereinafter. Such mounting of the motor 40 and the gear housing 41 is attained by means of mounting screws 43 that extend downwardly through the insulating top plate 35 so as to clamp the upper face of the gear housing 41 against the lower face of the insulating plate 41. For purposes that will become apparent hereinafter, the gear housing 41 is formed with an upstanding mounting lug 44 which has a clamping head 45 removably secured thereon by means of screws 46 so that one end of the flexible wire-feed housing 26 may be mechanically and electrically associated with the lug 44 in the proper relationship with respect to the wire feed mechanism 25. The details of this structure will be described in further detail hereinafter.

Electrical power connections for the motor and for the welding current are afforded by means of a power cable 48 that extends through the walls 36 and 39 and which is connected to the gear housing 41 by being extended into a mounting socket in the gear housing and in which mounting socket the end of the power cable is secured by means of a set screw 48S. The power cable 48 is, in the present instance, associated with a current-type control relay 50 that will be described in detail hereinafter, it being noted that the current relay 50 is mounted on the lower face of the top panel 35 and within the chamber 37 and the power cable 48 being wound through the window of and about one leg of the laminations 50L of the current relay.

The power cable 48, in the use of the apparatus, is connected to the one side of a welding generator or other power source which may afford a welding voltage and which may supply either alternating current or direct current, either type of current being suitable with the present apparatus. The other side of the source is connected through a relatively small wire 52 to certain elements of the control mechanism housed in the chamber 37, and this wire 52 is preferably extended along the cable 48 and attached thereto at spaced points to facilitate handling thereof.

In completing the welding circuit, still another relatively heavy and independent cable 53 is extended from the work W to the same power terminal as the wire 52, this being diagrammatically illustrated in Fig. 13 of the drawings.

The flexible hose-like housing 26 is shown in detail in Fig. 4 of the drawings, and as there shown it will be evident that this flexible housing 26 is afforded throughout most of its length by a flexible sleeve 55 of electrical-insulating material such as natural or synthetic rubber, or any suitable insulating plastic material having the requisite flexibility. Within this sleeve 55, a central passage is afforded by a coil spring 56 that is made from spring wire with the coils wound quite closely, and this affords a passage through which the flexible welding wire R may pass to the welding tip 30. The annular space between the coil spring 56 and the internal surface of the insulating sleeve 55 serves to house the electrical conducting means whereby the necessary low resistance current path is established between the lug 44 and the welding tip 30, and it should again be emphasized that the flexible housing 26 is separably related with respect to the extension 26E, as will be explained. The electrical conducting path is in the present instance afforded primarily by a plurality of independently formed wires 57 that are disposed parallel to and in an annular series about the coil spring 56 so as to be confined within the insulating sleeve 55. These wires 57 are held in the proper relationship with respect to the coil spring 56 during assembly as well as in use by winding a relatively strong wire 57W spirally around the series of wires 57, and after the wire 57W is thus secured in place, the entire assembly is covered by spirally winding an insulating tape 57T thereabout, as indicated in Fig. 4 of the drawings, after which this assembly is inserted into the insulating sleeve 55. At their right-hand ends, as illustrated in Fig. 4 of the drawings, the wires 57 extend into an axial socket 59 that is formed in a connecting sleeve 60 that is made from an electrically conducting material such as bronze. The ends of the wires 57 are preferably silver soldered into the socket 59 so as to afford a good electrical conducting path. It should be noted that the connecting sleeve 60 has a central bore therethrough and the end of the spring 56 extends through this bore and somewhat beyond the end 60E of the connecting sleeve 60 for purposes that will appear hereinafter. About the sleeve 60 and spaced substantially from the end 60E thereof, an annular insulating handle 61 is afforded, and this handle is secured in position by means including a set screw 62, and this set screw extends through the sleeve 60 and engages the coil spring 56 so as to thereby fix the endwise position of the coil spring 56 with respect to the sleeve 60.

At the other or left-hand end of the flexible housing 26, a connecting sleeve 65 of an electrically conducting material such as bronze is provided and the adjacent end of the coil spring 56 extends into the central bore of the connecting sleeve 65 and is fixed in position therein by means such as a set screw 66. The right-hand end of the connecting sleeve 65, as viewed in Fig. 4, has a connecting socket 67 formed therein and the adjacent ends of the wires 57 extend into the socket 67 and are silver soldered therein.

The connecting sleeve 65 serves as a part of the means for affording a disengageable electrical and physical connection between the housing 26 and the extension 26E, and for this purpose, the left-hand end of the sleeve 65 has an internally tapered socket 65S formed therein to receive the adjacent end of the extension 26E, as will be described.

The tapered socket 65S is arranged to receive the externally tapered end 67T of a metallic sleeve 67 that forms the external member of the extension 26E. This metallic sleeve is preferably made from copper and has a relatively thick wall to afford the necessary area in the conductive path, and within the sleeve 67, a coil spring 56E is mounted. It should be pointed out that the coil spring 56 and the coil spring 56E are provided merely for the purpose of affording a wearing surface to bear against the welding wire, and since the extension 26E need not be flexible, the internal surface may, in some instances, be afforded by a solid tubular member of steel or like material rather than as a spring 56E.

The tapered end 67T of the tubular member 67 may be firmly clamped endwise into the tapered socket 65S by operation of the removable handle 27, which in such functioning acts as a nut. Thus it will be noted in Fig. 4 of the drawings that the handle 27 at its left-hand end has a slightly enlarged counterbore 67C that terminates in a shoulder 67S facing to the left in Fig. 4, and adjacent its left-hand end, the counterbore 67C is internally screw threaded as at 167T so that it may be threaded onto what amounts to a threaded nipple 70 that extends outwardly in a lateral direction from one side of the hopper 28, the nipple 70 extending through and opening into the hopper 28 and being rigidly secured thereto as by welding at 71. The connecting sleeve 65 has an external abutment formed thereon by a snap-ring 73 so that the snap-ring 73 may be engaged by the shoulder 67S, and means are afforded for holding the end of the sleeve 67 against left-hand movement with respect to the nipple 70. As shown in Fig. 4, this is accomplished by affording an annular collar 74 on the sleeve 67 adjacent to the large end of the tapered end 67T, and this annular collar 74 may be made from brass and may be secured to the sleeve as by silver soldering. Within the nipple 70, an insulating sleeve 75 is mounted so that it may surround the ring 74 and the adjacent end of the connecting sleeve 65, and this insulating sleeve 75 has an inwardly projecting annular flange 75F against which the abutment ring 74 may bear. The outer or left-hand face of the flange 75F is arranged to bear against an internal snap-ring 77 that is fixed within the nipple 70, and thus by tightening the handle 27, the tapered socket and the tapered end 67T may be forced into firm physical and electrical contact. It should be pointed out, in respect to the structure that has just been described, that the extension 26E is removably mounted with respect to the hopper 28, and the internal diameter of the nipple 70 and the snap-ring 77 are made large enough to permit ready withdrawal of the extension 26E when this is desired.

At its other or lower end, the sleeve 67 of the extension 26E is internally screw threaded as at 26T to receive the externally screw threaded upper end of the welding tip 30. This enables the welding tip 30 to be readily removed and replaced, such removal of the welding tip 30 being necessary in order to permit ready withdrawal of the extension 26E as above described. The welding tip, of course, requires replacement at intervals, either due to wear or when the diameter of the welding wire R is to be changed. As the welding wire R must undergo substantially a 90° change of direction as it passes through the extension 26E, there is a tendency to assume a bent condition, and it has been found that this may be effectually overcome by forming the extension 26E with a first downward bend 426E that is greater than would otherwise be required, and then between the bend 426E and the tip 30, providing a relatively sharp connective bend 526E in the opposite direction.

The welding tip 30 is, of course, tubular in character, and the tip 30 is located in the desired centered relationship with respect to the discharge orifice 31 by means including a plurality of adjustable set screws 30S that extend radially through the upper portion of the discharge head 32 and which at their inner ends engage an insulating sleeve 80 that surrounds the tip 30 just below the lower end of the sleeve 67. These set screws 30S extend through suitable openings in the side wall of the hopper 28 so as to serve not only as a centering means for the welding tip 30, but also to hold the discharge head 32 in position on the hopper 28. It might be pointed out in this connection that the discharge head 32 also requires replacement at intervals due to wear, or to afford a different thickness of welding flux on the rod R, or to afford a different form of head where a different type of welding is to be done, as will be explained hereinafter.

The coil 24 of welding wire R may be readily and easily put in place on the reel 23 so as to be properly centered and so as to be held against undesired unwinding movement which would normally be induced by the resiliency of the wound wire in the coil 24.

Thus, as shown in Figs. 1 to 3 and 14 to 17, the reel 23 is mounted on a stationarily mounted vertical stud 85 that is carried on a bottom mounting base 86, such base being secured to the top plate 35 by means such as screws 87. The mounting stud 85 extends upwardly and has a reduced screw threaded upper end 88 that affords upwardly facing stop shoulder 88S, and the reel 23 is adapted to be placed in position on the stud 85 below the shoulder 88S. The reel 23 is formed primarily from a pair of identical spiders 23S, each having a central hub 23H that is adapted to surround and rotate about the stationary stud 85. Each spider 23S has four arms spaced 90° apart, and one pair of arms is provided with a single projecting lug 23L on each arm spaced from the ends of the arms, and equally spaced from the axis of the hub 23H. The other two arms of the spider are provided with pairs of spaced lugs 23L2 that are spaced from the axis of the hub 23H and from the ends of the arms in the same distance as the lugs 23L. Thus when the two spiders 23S are rotatively displaced 90° from each other, one of the lugs 23L may extend downwardly into the space between the lugs 23L2 of the other spider, thus to rotatively interlock the spiders and at the same time to afford a continuous abutment surface to bear against the inner surface of the coil 24 and center the coil with respect to the axis of the spiders. In this respect, attention is directed to Fig. 17 of the drawings and to the fact that each of the lugs 23L and 23L2 has tapered surfaces so that the coil and the lugs may be readily moved into the desired relationship within the coil 24.

The hubs 23H have their adjacent ends somewhat reduced to afford axially facing shoulders 123S, and in the assembly of the reel, an expansive coil spring 89 is disposed between the shoulders 123S. Beneath the lower one of the spiders 23S, a flat insulating washer 90 is disposed on top of the base plate 86 and similarly an insulating washer 91 is disposed about the reduced portion 88 and on the shoulder 88S and the assembly is held together by means of a wing nut 92 threaded onto the threaded upper end 88 of the stud 85. It is to be noted that the action of the spring 89 is such as to press the spiders 23S into firm frictional contact with the washers 90 and 91 and this provides a breaking action on the reel 23, as will be described. The reel is provided with a lug 94 on one of the arms thereof, and this lug has an opening 95 therein into which one end of the welding wire R is thus anchored, since there would normally be a tendency for the coil 24 to unwind, but through the provision of the frictional breaking means above described, this unwinding tendency is overcome.

The wire feed mechanism 25 is shown in detail in Figs. 10 to 12 wherein it will be evident that this mechanism is afforded by a casting 95 in which a pair of opposed feed rolls 96 and 97 are mounted on vertical axes. The feed roll 96 in the present instance constitutes the driven roll of the feed roll couple, the roll 97 constituting a pressure roll which, under the present invention, is adjustably mounted so as to enable different feed pressures to be attained and to accommodate different thicknesses of welding wire. The casting 95 is hollow in character so as to afford an upper wall 95U and a lower wall 95W, and permanently mounted in the upper wall 95U is an antifriction bearing 98 that is adapted to embrace the projecting upper end of the drive shaft 42. Beneath the bearing 98, the feed roll 96 is removably positioned so as to enable this feed roll to be replaced when this is required, and it will be noted that the feed roll 96 has a knurled annular slot 96S therein which engages the welding wire R that is being fed thereby. The housing or casting may readily be put in position in its operative relation to the shaft 42 merely by moving the casting downwardly over the shaft 42, and when this is done, a relatively large opening 101 in the bottom wall 95W moves into embracing relationship with respect to a lower antifriction bearing 102 that is located in surrounding relation to the shaft 42 on the upper face of the plate 35. As this mounting movement progresses, the feed roll 96 is drivingly engaged with the shaft 42, and in the present instance this is accomplished by affording a permanently mounted transverse drive pin 103 in the shaft 42 just above the bearing 102, this drive pin 103 engaging a downwardly facing transverse drive groove 103A that is formed in the lower face of the feed roll 96.

The welding wire R is fed into the bight between the feed rolls 96 and 97 past a guide roller 104 that is mounted on a vertical pin 105 that extends between the top and bottom walls of the casting 95. The vertical pin 105 serves as a pivotal mounting for a swinging mounting bracket 106 in which the pressure roller 97 is mounted on a vertical pin 107, and by swinging the mounting bracket 106, the desired adjustment of the feed roll 97 may be accomplished. Such swinging movement is applied to the swinging bracket 106 by means of an adjusting screw 108 that extends through an end wall 95E of the casting 95 and which engages a cross web of the bracket 106.

The position of the casting 95 about the axis of the drive shaft 42 is governed and may be adjusted by means of a set screw 109 that extends through the lug 44 and which engages a vertical side wall of the casting 95, as shown in Figs. 3 and 10.

It will be noted that when the projecting end of the mounting sleeve 60 is secured between the lug and the cap 45, the end of the coil spring 56 projects to a point relatively close to the feed rollers 96 and 97, and this assures proper feeding of the welding wire R even though the diameter of the welding wire may be relatively small. The adjustment that is afforded by the screw 109 is important in the use of the present apparatus in that it enables the casting 95 and the guide roll 104 and the feed rolls 96 and 97 that are carried thereby to be adjusted to produce a straightening action upon the welding wire R as such wire is fed into the flexible housing 26.

The feeding of the welding wire R is accomplished in such a way that this feed speed is proportional to the voltage drop in the welding circuit, and to accomplish this, the motor 40 is in the form of a series wound universal motor, thus making the motor 40 operable regardless of the type of current that is utilized. The manner of connection of the motor and the other electrical elements of the apparatus is schematically illustrated in Fig. 13 of the drawings and, as hereinbefore described, the welding cable 48 is connected to the gear box 41, and by means that are schematically indicated at 41A in Fig. 13, circuit is extended through the gear box 41 and the rigidly connected motor frame to one end of the field coil 110 of the motor 40, this field winding 110 being connected through an armature 110A and to a terminal 111 by means including the usual commutator and brush structure. A wire 112 extends the motor circuit to one terminal of a rheostat 113 and wires 114 and 115 in series extend this circuit to one stationary contact of the relay 50, the other stationary contact being connected by a wire 116 and a fuse 117 to the wire 52. The current relay 50 is of the normally open type, and is operated to its closed position by a current flow which takes place in the cable 48 when the welding arc is struck. A condenser 118 is connected across the contacts of the relay 50 to reduce sparking. An indicating light 119 is also connected across the contacts of the relay 50 in parallel with the condenser 118, and this indicating light 119 is energized when the welding apparatus has been properly connected to the source of welding current, thus to indicate that the apparatus is ready for operation. The current flow through the light 119 is insufficient to cause operation of the motor 40, and when the relay 50 is closed, the light 119 is shunted and remains de-energized during the period when the actual welding is taking place.

The rheostat 113 serves as an adjustment for the speed of the motor 40 and by this adjustment the arc length that is to be effective in the welding operation may be adjusted and determined. Since the voltage drop across the arc varies with the spacing of the welding wire from the work, the series wound motor 40 varies in its speed so as to maintain the desired spacing between the welding wire R and the work.

In the setup of the present welding apparatus, and particularly in the mounting of the welding wire R in the machine, it is desirable to utilize the feed rolls 96 and 97, and for this purpose, an inching control switch 120 is provided on the upper face of the panel 35 of the carriage. This switch 120 is in the form of a push button switch of the single-pole double-throw type, having a pair of spaced movable contact bars 120—1 and 120—2 that are actuated in unison. The contact bar 120—1 is normally engaged with a pair of stationary contacts 122, while the contact bar 120—2 is normally located in spaced relation to a pair of stationary contacts 123. When the inching 120 is in its normal position, it serves, in the present instance, to place a voltage divider 125 in parallel with the rheostat 113 and this serves to increase the wattage capacity of the rheostat 113. This normal circuit is afforded by a wire 126 that extends from the terminal 111 to one end of the voltage divider 125, and a wire 127 that extends from the other end of the voltage divider to one stationary contact 122 of the switch 120, the other contact 122 being connected by a wire 128 to the wire 114. When the switch 120 is actuated, the aforesaid parallel circuit is broken and the inching circuit to the motor 40 is completed. This inching circuit is afforded by a wire 130 that extends from the wire 116 to one of the stationary contacts 123, the other stationary contact 123 being connected by a wire 131 to a contact 133 that is adjustable along the voltage divider 125. The circuit to the motor 40 is in such an instance completed through the voltage divider and the wire 126 through the motor windings and the cable 48. The voltage divider 133 affords a means for adjusting the inching speed of the motor 40.

When a welding arc is struck, the current flow in the welding wire R produces a magnetic field about the welding wire, and this field is utilized to cause the advancing welding wire R to be progressively coated with welding flux which, of course, must be of a magnetizable character, and while the thickness and density of this coating of welding flux tends to vary with the magnitude of the welding current, the limitation imposed by the diameter of the discharge orifice 31 renders this factor immaterial where small diameter welding wires are being used.

The magnetizable welding flux within the hopper 28 tends, of course, to flow downwardly and out through the annular space between the welding wire R and the sides of the discharge orifice 31, but during the actual welding operation, this tendency is controlled and limited by the magnetic field that is created about the welding wire. However, upon termination of a welding operation, the magnetizable welding flux tends once more to become a free flowing body so that there is a tendency for such welding flux to leak out of the discharge orifice 31. Under and in accordance with the present invention, means are afforded whereby such loss of welding flux is eliminated, and, as shown in Fig. 4 of the drawings, this result is attained by means of a simple and effective character. Thus, a plurality of permanent magnets 135 are mounted in the discharge head 32 at radially spaced points about the discharge orifice 31, and these magnets create a magnetic field across the discharge orifice and of such a strength as to block or overcome the free flowing tendency of the magnetizable flux.

During a welding operation, it is well known that there is a tendency for the molten metal to spatter, and the discharge head 32 under the present invention affords means for protecting the discharge orifice 31 against blocking of such spatter. Thus, as shown particularly in Fig. 4 of the drawings, an annular projecting flange 136 is provided in a centered relationship on the lower end of the discharge head 32, and while this flange 136 projects but a short distance, it has been found that this is sufficient to prevent splatter of molten metal upwardly into the discharge orifice 31, and this assures continued satisfactory operation of the present apparatus.

As hereinbefore pointed out, the present apparatus may be utilized for submerged arc welding, and the quick and easy adaptation of the apparatus for such use is illustrated in Fig. 4A of the drawings. Thus, in such an instance, the discharge head 32 is removed and is replaced by a discharge head 232 having a relatively large open lower end 232E so that the welding flux may flow freely through this opening and form a relatively heavy or deep flux blanket F2 as indicated in Fig. 4A. It will be recognized, of course, that in such use of the apparatus, the welding flux preferably does not have the magnetizable characteristic hereinbefore described.

In Fig. 7 of the drawings, an alternative embodiment of the invention is illustrated wherein the blocking or valve magnets 135 have been eliminated, and in this instance, the welding tip 30 is identified as tip 330 and is made from a permanent magnet material. The tip 330 is magnetized so that north and south poles are formed at the respective ends thereof, and with this arrangement, the lower end of the welding wire R is continuously magnetized and this serves to attain a valving or blocking action at the discharge orifice 31 in the same general manner as the magnets 135 hereinabove described. In this instance, however, an additional advantageous effect is obtained in that the magnetizable flux is maintained on the projecting end of the welding rod R, even after the welding arc has been broken.

In Figs. 8 and 9, another alternative embodiment of the invention is illustrated in which magnetic forces are provided that are similar to the forces that are effective in the embodiment of the invention shown in Fig. 7. Thus, in the embodiment shown in Figs. 8 and 9, the magnets 135 are eliminated, and the welding tip 30 is of substantially the same form and material as that shown in and described with respect to Fig. 4. In this embodiment of the invention, however, a pair of horseshoe permanent magnets 435 are provided, and these magnets have their opposite poles extended through openings 436 in the side walls of the tip so that the pole faces of the magnets 435 are disposed adjacent to the welding wire. The magnets 435 are held in place by screws 437. The opposite north and south poles of each magnet 435 are, of course, spaced longitudinally with respect to the welding rod or wire, and corresponding poles of the two magnets 435 are located in corresponding positions. This serves to magnetize the lower end of the welding wire R, thus to produce the desired valving or retaining action and acting to prevent shedding of the magnetizable flux when the welding arc is discontinued.

From the foregoing description, it will be apparent that the present invention affords a continuous arc welding apparatus that is simple in character and which is relatively portable so as to facilitate use thereof in different locations in a shop or other welding location. It will also be apparent that the apparatus of the present invention may be utilized for different types of arc welding and that the changes and revisions in the apparatus to change from one welding technique to another are quite simple in character. It will also be evident that the apparatus of the present invention affords means for controlling the application of magnetizable welding flux to an uncoated welding wire and that under the present invention, the projecting coated portion of a welding wire is maintained in its coated condition even after the welding arc is broken. Under the present invention, the feeding of the welding wire is attained in a highly advantageous manner so that the straightening action on the wire may be governed and controlled, and the provision of braking means on the supply reel serves to maintain the coiled welding wire in the proper relationship at all times.

Under the present invention, the feeding of the welding wire through the flexible guide housing is attained in a simple and advantageous manner, and the guide means that form the guide housing are related in such a way that the forward portions of the welding wire may readily be removed in case the wire freezes to the welding tip in the course of a welding operation. The hopper that is afforded for the welding flux is of such a character that it may be readily handled and manipulated, and in this connection it is to be observed that the handle, by means of which the hopper is supported, serves the additional function of securing the separate portions of the flexible guide housing together. In the use of the welding hopper of the present invention, the lower discharge orifice through which the welding wire passes is protected against clogging by splatter of the molten welding material, and this assures continued proper operation of the welding apparatus.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a continuous automatic arc welding apparatus, an elongated wheeled carriage having a top wall and a compartment formed in said carriage beneath one end of said top wall, a reel mounted on and over said top wall near the other end thereof and on a vertical rotative axis for holding a supply coil of welding wire, means on said reel for anchoring one end of the welding wire of such a coil, a flexible guide tube having one end connected in a horizontal position to said carriage above said top wall and adjacent to said one end of said wall and with said one end of the guide tube pointing toward said reel, a feed roll mechanism mounted on said top wall adjacent to said one end of said flexible guide tube and between said guide tube and said reel, an electric series type drive motor located in said compartment and drivingly connected to said feed rolls for feeding a welding wire from said reel progressively into and through said flexible guide tube, a flux hopper for magnetizable flux mounted on the other end of said guide tube and including a flux discharge orifice, means affording a continuation of said guide tube through and into said hopper and terminating in a lower end located at a point above said orifice, a tubular welding tip connected to said lower end and aligned with and spaced axially from said orifice whereby a welding wire fed through said tip will pass out of said orifice in a centered relation, a protective sleeve extended from said hopper in coaxial relation with respect to said orifice and including a discharge opening, means extended through the hopper adjacent said orifice thereof and manually adjustable exteriorly of said hopper to enable said tip to be adjustably centered in respect of said discharge opening, means extended through said guide tube and said extension for affording a welding circuit from said carriage to said tip, and permanent magnet means affording a field of magnetic force for blocking passage of magnetizable flux through said orifice when the apparatus is idle, and means connecting the energizing windings of said series motor across said circuit.

2. In a continuous automatic arc welding apparatus, an elongated wheeled carriage having a top wall and a compartment formed in said carriage beneath one end of said top wall, a reel mounted on and over said top wall near the other end thereof for holding a supplying coil of welding wire, means on said reel for anchoring one end of the welding wire, a flexible guide tube having one end connected in a horizontal position to said carriage above said top wall and adjacent to said one end of said wall and with said one end of the guide tube pointing toward said reel, a feed roll mechanism mounted on said top wall adjacent to said one end of said flexible guide tube and between said guide tube and said reel, an electric drive motor located in said compartment and drivingly connected to said feed rolls for feeding a welding wire from said reel progressively into and through said flexible guide tube, a flux hopper mounted on the other end of said guide tube and including a flux discharge orifice, means affording a continuation of said guide tube through and into said hopper and terminating in a lower end located at a point above said orifice, a tubular welding tip connected to said lower end and aligned with and spaced axially from said orifice whereby a welding wire fed through said tip will pass out of said orifice in a centered relation, means associated with said hopper and manually adjustable exteriorly thereof to enable said welding tip to be adjustably centered in respect of said discharge orifice, and with means extended through said guide tube and said extension for affording a welding circuit from said carriage to said tip.

3. In a continuous automatic arc welding apparatus, an elongated wheeled carriage having a top wall and a compartment formed in said carriage beneath one end of said top wall, a reel mounted on and over said top wall near the other end thereof and on a vertical rotative axis for holding a supply coil of welding wire of such a coil, friction brake means effective to retard rotative movement of said reel, a flexible guide tube having one end connected in a horizontal position to said carriage above said top wall and adjacent to said one end of said wall and with said one end of the guide tube pointing toward said reel, a feed roll mechanism mounted on said top wall adacent to said one end of said flexible guide tube and between said guide tube and said reel, an electric drive motor located in said compartment and drivingly connected to said feed rolls for feeding a welding wire from said reel progressively into and through said flexible guide tube, a flux hopper mounted on the other end of said guide tube and including a flux discharge orifice, means affording a continuation of said guide tube through and into said hopper and terminating in a lower end located at a point above said orifice, a tubular welding tip connected to said lower end and aligned with and spaced axially from said orifice whereby a welding wire fed through said tip will pass out of said orifice in a centered relation, a protective sleeve extended from said hopper in coaxial relation with respect to said orifice and including a discharge opening, means extended through said hopper adjacent said orifice and adjustable exteriorly thereof to enable said tip to be adjustably centered in respect of said discharge opening, and means extended through said guide tube and said extension for affording a welding circuit from said carriage to said tip.

4. In a continuous welding apparatus, a carriage having an upwardly projecting mounting shaft, a rotatable reel on said shaft for supporting a coiled supply of welding wire, said reel comprising separable upper and lower spiders mounted on said shaft, upper and lower friction disks disposed above and below said upper and lower spiders, detachable means holding said upper friction disk in place, a coil spring mounted about said shaft and urging said spiders into frictional contact with said disks, a feed roll mechanism on said carriage spaced from said reel and having feed rolls on axes parallel to the axis of said reel, said feed roll mechanism serving to anchor one end of the wire of such a coil, and means on one of the spiders of said reel for anchoring the other end of said coil.

5. In a continuous welding apparatus, a carriage having an upwardly projecting mounting shaft, a rotatable reel on said shaft for supporting a coiled supply of welding wire, said reel comprising separable upper and lower spiders mounted on said shaft, upper and lower friction disks disposed above and below said upper and lower spiders, detachable means holding said upper friction disk in place, a coil spring mounted about said shaft and urging said spiders into frictional contact with said disks, a feed roll mechanism on said carriage spaced from said reel and having feed rolls on axes parallel to the axis of said reel, said feed roll mechanism serving to anchor one end of the wire of such a coil, means for adjusting said feed roll mechanism to different positions on said carriage to impart straightening forces to a welding wire feed thereby, and means on one of the spiders of said reel for anchoring the other end of said coil.

6. In a continuous arc welding apparatus, an elongated wheeled carriage having a top wall and a compartment formed in said carriage beneath one end of said top wall, a reel mounted on and over said top wall near the other end thereof and on a vertical rotative axis for holding a supply coil of welding wire, means on said reel for anchoring one end of the welding wire of such a coil, a drive motor and reduction gear mechanism mounted in said chamber and having a mounting lug rigid therewith and projecting upwardly through said top wall and adjacent to said one end of said wall for clamping one end of a flexible guide tube in a position pointing toward said reel, a feed roll mechanism mounted on said top wall adjacent to said one end of said lug and between said lug and said reel, said gear mechanism having an output shaft projecting upwardly through said wall and drivingly connected to said feed rolls for feeding a welding wire from said reel progressively into and through such a flexible guide tube, and means on said lug engageable with said feed roll mechanism for shifting the same to attain a straightening action on such a wire.

References Cited in the file of this patent

UNITED STATES PATENTS

| 1,580,020 | Cutler et al. | Apr. 6, 1926 |
| 1,953,915 | Burgett et al. | Apr. 3, 1934 |
| 1,959,180 | Stephens | May 15, 1934 |
| 1,959,194 | Chapman | May 15, 1934 |
| 2,189,399 | Lewbers | Feb. 6, 1940 |
| 2,198,085 | Le Tourneau et al. | Apr. 23, 1940 |
| 2,314,917 | Baird | Mar. 30, 1943 |
| 2,478,525 | Cutrer | Aug. 9, 1949 |
| 2,536,294 | Landis et al. | Jan. 2, 1951 |
| 2,666,122 | Curtin et al. | Jan. 12, 1954 |
| 2,666,832 | Landis et al. | Jan. 19, 1954 |

FOREIGN PATENTS

| 608,270 | Great Britain | Sept. 13, 1948 |

OTHER REFERENCES

"Industry and Welding" Monthly for February 1954, pp. 66–68.